United States Patent Office 2,859,581
Patented Nov. 11, 1958

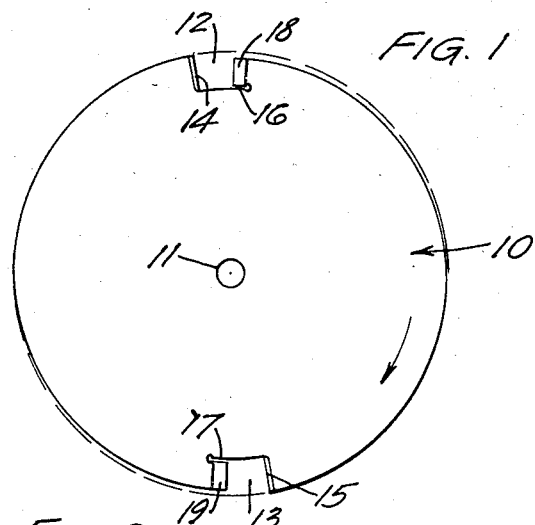
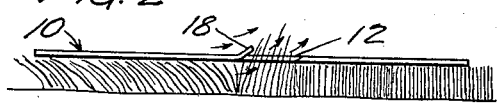
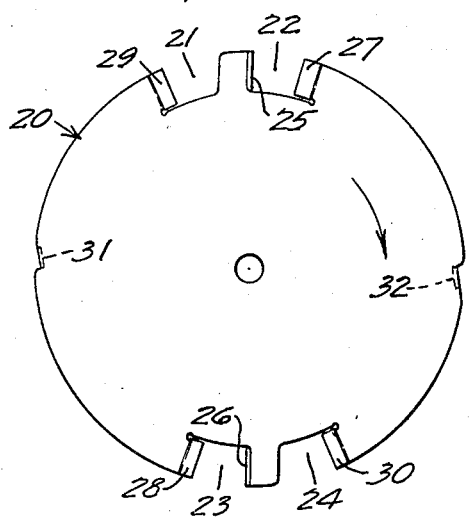
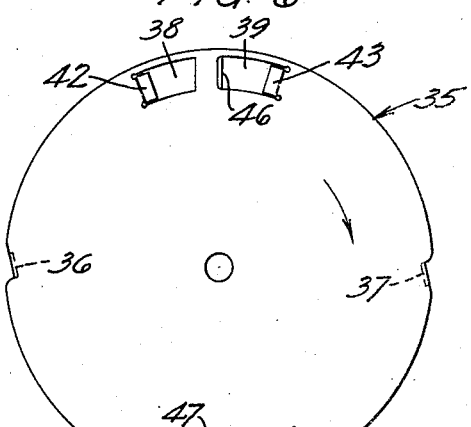
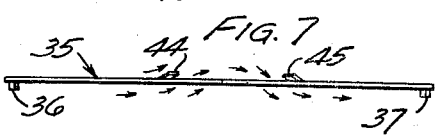
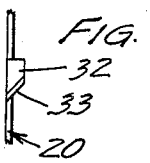

2,859,581
SAFETY MOWER BLADE

Harley E. Kroll, Hopkins, and Don O. Benson, Minneapolis, Minn., assignors to Toro Manufacturing Corporation of Minnesota, Minneapolis, Minn., a corporation of Minnesota Application July 2, 1954, Serial No. 441,142

12 Claims. (Cl. 56—295)

This invention relates to grass mowing machines. More particularly, it relates to mower blades for rotary grass mowing machines of the type utilizing a blade revolving in a horizontal plane about a vertical shaft.

The principal criticism of the type of lawn mowing machine which utilizes a blade revolving on a horizontal axis about a vertical shaft is that the grass is not cut sufficiently close to present the neat and trim appearance so highly desired. This is primarily true because of the failure of much of the grass to stand truly erect. In other words, many of the blades lean to one side or to the other and when the rotary blade passes across the area, the leaning blade is not cut as sufficiently short as is desired. On the other hand, if the rotary mower blade is lowered sufficiently close to the surface to cut such leaning blades as short as is considered desirable, scalping will result. "Scalping" is the term utilized to refer to the slicing off of a portion of the sod by the rotary blade. Our invention is designed to overcome this disadvantage.

Another problem which is equally as serious is the danger which is attendant with such rotary mower blades. Because there is no stationary blade provided for co-operation with the rotary blade to provide a scissor-like action, these blades must necessarily travel at a very high speed. When traveling at such a high speed, there is considerable danger of the user and observers being struck by foreign objects which are engaged by the rapidly rotating blade and projected through the air thereby at high speeds. Many serious injuries have resulted from this cause and it is one of the principal reasons why this particular type of mowing machine may not continue to enjoy greater popularity. When the conventional type rotary blade strikes an object quite solidly and with such force, a projectile having a dangerous trajectory can result. A secondary danger can occur from pieces of a conventional blade being fractured by encountering a sharp object of appreciable mass and, thence, being projected in a dangerous trajectory. Both of these inherent dangers are appreciably alleviated by our blade, and our invention is directed toward overcoming these disadvantages.

It is a general object of our invention to provide a novel and improved rotary lawn mower blade of inexpensive and simple construction and having increased strength.

A more specific object is to provide a novel and improved rotary lawn mower blade of inexpensive and simple construction and having improved safety features.

A still more specific object is to provide a novel and improved rotary lawn mower blade constructed to effectively eliminate substantially all dangers of injury from foreign objects being thrown by the blade.

Another object is to provide an improved rotary lawn mower blade designed to make it impossible to impart a dangerous trajectory to any objects of appreciable mass which it may encounter.

Another object is to provide a novel rotary lawn mower blade constructed to effectively cause light material such as grass and the like to stand erect directly ahead of the cutting element to insure that it will be cut off at its lowest possible elevation.

Another object is to provide a novel rotary lawn mower blade constructed to differentiate between material of relatively low density, such as grass, and foreign objects having a substantially higher density such as stones, sticks, boards, etc., and to thus preclude injury as a result of throwing of the same by the blade and to also avoid serious damage to the cutting element itself.

Another object is to provide an improved rotary lawn mower blade having increased sturdiness while requiring a minimum of material to construct the same.

Another object is to provide a novel rotary lawn mower blade having an auxiliary cutting element of simple and inexpensive construction designed to engage and cut the taller grasses prior to their engagement by the primary cutting element.

Another object is to provide a novel and improved rotary lawn mower blade constructed to provide a re-circulation of air into the path of successive oncoming cutting elements to thereby provide comminution of the cut grass.

Another object is to provide an improved rotary lawn mower blade which will substantially reduce the amount of noise normally attendant with the operation of such blades.

Another object is to provide a novel rotary lawn mower blade constructed so as to reduce the amount of vibration resulting from the rotation of such a blade and thereby increasing the life and service of the engine driving the same.

Another object is to provide a novel rotary lawn mower blade constructed to require less power for its operation by eliminating the "beating-up" of the air within the lawn mower housing.

These and other objects and advantages of our invention will more fully appear from the following description, made in connection with the accompanying drawings wherein like reference characters refer to the same or similar parts throughout the several views and in which:

Figure 1 is a plan view of one embodiment of our invention; and

Figure 2 is a side elevational view of the same;

Figure 3 is a plan view of a second embodiment of our invention; and

Figure 4 is a side elevational view of the same;

Figure 5 is a fragmentary side elevational view of the structure shown in Figure 3, looking at the right hand side thereby as viewed in Figure 3;

Figure 6 is a plan view of a third embodiment of our invention; and

Figure 7 is a side elevational view of the same.

A primary design criteria is to produce a blade that cannot impart dangerous trajectories to particles of an appreciable mass which it encounters. This is accomplished by our safety blade as outlined hereinbelow.

First, a cutting edge is only sufficiently exposed to permit contacting blades of grass, in particular those that are encountered as the blade is pushed or driven forward at some optimum speed. The exposed edge, considering rotational speed of the blade and forward speed of the unit, will be only a fraction of an inch. The combination of these velocities generates an advancing circle, a portion of which approaches a Spiral of Archimedes and can be defined by an equation $\rho(\text{rho}) = (R - b\theta(\text{theta}))$ where $\rho$ (rho) and $\theta$ (theta) are the distance and angle respectively from the center of rotation of the disc to the point in question, "R" is the radius of the disc, and "b" is the distance along the line of linear motion from a fixed reference.

Another description would be the locus of points of a point at the extremity of a rotating blade which is advancing in a straight line normal to its axis of rotation. Mathematically, the figure generated by this point is known as a Curtate Trochoid, the minor or rolling radius being that required to arrive at the forward speed of the mower, and the major or generating radius being equal to the radius to the tip of the cutting element. This can be likened to the Palmer Method Penmanship exercise of writing an advancing circle.

This cutback along a line approaching a Spiral of Archimedes permits a blade of grass which was barely missed by one cutting element to remain erect as the mower advances until the succeeding cutting element can contact the blade of grass. As a result, any particle of mass encountered by this exposed cutting element will be struck at its edge, resulting in a spinning motion about its centroid. It is true that this spinning may result in the object rolling away from the mower, but it will have little linear energy. This principle can probably be best pictured mentally by consideration of a "topped" golf ball that will spin very fast, but will have a quite harmless trajectory when compared to a ball hit "on center." The latter ball in its flight can cause fatal injuries; the former only mental anguish. By the criteria set forth above, a cutting blade comprising a series of spirals with only a fraction of an inch of exposed edge at various points on the periphery would accomplish the foregoing.

The energy of motion, or kinetic energy, is the danger associated with a particle of mass in motion when this particle contacts an object. In this discussion, and more specifically, it becomes the consideration of a stone being accelerated by contact with the fast moving blade. The energy that this stone then possesses is dependent on its mass and its velocity, and the danger lies in the effect produced on a body in its path. Mathematically, the equation for this energy becomes $F=\frac{1}{2}mv^2$. The velocity is noted to be a squared function; hence, at one-half the velocity, the energy becomes only one-fourth. The velocity which we consider is only the factor involved in generating a curvilinear path for the mass. Therefore, to impart maximum velocity the stone must be contacted at its exact centroid or center of gravity. Any contacting remote from the centroid results in two motion vectors which we must consider. One vector tends to turn the object about its centroid; the other tends to displace the object in a straight line. The latter is the only one which concerns this case. It is the object of this invention to preclude the possibility of a cutting edge ever hitting an object of dangerous mass at its centroid. Thusly, the energy formula results in a very low value of the velocity component with which we are interested.

It is considered very desirable for some types of grass cutting that a pressure differential between the lower and upper air layers (below and above the blade) be established to cause a "suction" effect which will tend to lift the blades of grass (also weeds, leaves, etc.) into a more erect position for uniform and best cutting. We have found this can be accomplished by providing a "lift section" of a blade with a resultant propeller or fan action causing a low pressure area in the vicinity of the rotating blade and causing an airflow from below to above the cutting plane. This requires an application of Bernoulli's theorem on airflows and pressures. Because of the low "activity factor" (relation of solid area of effective lift section to the exposed area of the swept disc) the conventional blade has very local effective lift areas and they immediately succeed the cutting edge. In addition, a conventional blade generates considerable turbulence, and undesirable vortices result that are not to advantage in maintaining desirable airflow and resultant lift characteristics.

The first embodiment of our invention, as shown in Figures 1–2, consists of a flat disc 10 made of rigid metal and adapted at its center as at 11 to be connected or mounted upon a vertical shaft mounted for rotation within a lawn mower housing of the conventional rotary lawn mower type. The opening as at 11 in the disc 10 permits the vertical shaft (not shown) to extend through the disc 10 and a securing nut applied to the lower end of the shaft to retain the disc and to drive the same at high speed with the rapidly rotating shaft. As best shown in Figure 1, the periphery of the disc 10 is broken at opposite sides with portions of the disc cut away as at 12 and 13. One of the edges of the disc defining the cut-away portion is sharpened to provide a cutting edge or knife element 14 or 15. A slit 16—17 formed along a circle concentric with the disc 10 is then cut so as leave a lip 18—19 extending free. As best shown in Figure 2, these lips 18 and 19 are bent upwardly to form air deflector elements or fans. The disc 10 is rotated in the direction of the arrow shown in Figure 1 so that the knives 14 and 15 will cut any grass or weeds which extend upwardly to the elevation of the disc 10. It will be noted that the deflector elements 18 and 19 are positioned directly ahead of and immediately adjacent to the knife elements 14 and 15 so that during rotation of the disc 10 these deflector elements will immediately precede the knives 14 and 15.

It will be noted that the periphery of the disc 10 defines substantially an Archimedes spiral commencing at the area of the deflector elements 18 and 19 and extending outwardly and terminating at the knives 14 and 15. In other words, the outermost point of the knives 14 and 15 extends outwardly a very small distance farther than the peripheral portions of the deflector elements 18 and 19 and the portions of the disc immediately adjacent thereto. Thus, as the disc 10 is rotated rapidly in the direction of the arrow shown, only the outermost tip of the knives 14 and 15 will engage objects of relatively large mass as compared to grass which may lie in the path of the rotating disc. Thus by reference to Fig. 1 it can be seen that the radial length of the cutting edge is less than one-fifth of the radius of the disc 10, and the radial length of the outermost tip of the knives 14 and 15 on a disc of 18-inch diameter will be only about $\frac{3}{16}$ of one inch, while the radial length of the entire cutting edge 15 will be only about one and one-half inches. It is evident from the foregoing description that the outer periphery of the blade generally increases in diameter from a point adjacent a fan to a point adjacent a cutting edge. The term generally as used in the specification and claims in defining the increase in diameter of the periphery is intended to include slight irregularities or cut-out portions which might be formed in the outer periphery intermediate a fan and a cutting edge, the essential feature of the construction being that the outermost point of the cutting edges extends outwardly a very small distance farther than the peripheral portions of the deflector elements or fans adjacent thereto.

Figures 3–5 show a second embodiment of our invention. It is comprised of a disc 26 of rigid metal having cut-away portions as at 21, 22, 23 and 24. Knife or cutter elements 25 and 26 are formed on the portion of the disc between the two adjacent cut-away areas so that, as the disc 20 is rotated in the direction of the arrow shown in Figure 3, these knives will engage the grass and sever the same. Immediately ahead of the knife element 25 an upwardly extending deflector element or lip 27 is formed from the material of the disc in the same manner that the lips 18 and 19 are formed in the embodiment described above. An upwardly extending lip or deflector element 28 is formed in a similar manner immediately ahead of the knife 26 and the area therebetween is open, as shown in Figure 3.

Immediately behind the two knives 25 and 26 there is a second deflector element formed from the material of the disc 20 by striking a portion thereof upwardly, as best shown in Figure 4. Behind the knife 25 a deflector element 29 extends upwardly from the disc to divert the air flow and cut grass downwardly again beneath the disc 20 to thereby provide a recirculation of the air and grass. Behind the knife 26 there is a deflector element 30 formed in the same manner and performing the same function.

Also formed from the peripheral portions of the disc 20 is an auxiliary cutter element designed to engage the taller grasses which may have been bent over by the housing surrounding the disc and thusly not presented at the best attitude for cutting the same off at a low level. Approximately midway between the knives 25 and 26 and on opposite sides of the disc 20, a part of the peripheral portion of the disc 20 is struck downwardly to form a downwardly extending lip or cutter element 31 or 32. The leading or forward edge of this lip 32 is sharpened as at 33 to provide a cutting edge which will sever the taller weeds when they are engaged thereby. It will be noted that this auxiliary cutter element extends outwardly in the direction of rotation of the disc.

The third embodiment of our invention, as shown in Figures 6–7, is formed quite similarly to the embodiment shown in Figures 3–5 with the exception that the peripheral portions of the disc 35 are substantially unbroken except for auxiliary cutter elements 36 and 37 which are formed similarly to the cutter elements 31 and 32 shown in Figure 3. The disc 35 is rotated in the direction of the arrow shown in Figure 6 and, of course, is adapted to be mounted upon a vertical shaft for rotation therewith at the center of the disc. Portions of the disc 35 are cut away as at 38, 39, 40 and 41. Portions of the disc are upstruck to form air deflector elements 42, 43, 44 and 45. The leading edge of the material between the cut-away portions is sharpened to provide a cutter or knife element 46 and 47. Each of the deflector elements 42, 43, 44 and 45 extend upwardly. The two deflector elements 43 and 44 precede the knives 46 and 47 respectively and create an updraft immediately thereahead. The two deflectors 42 and 45 trail the knife elements 46 and 47 respectively and deflect the air and cut grass downwardly beneath the disc 35 until the next oncoming deflector element again draws the air and cut grass upwardly across its associated knife element.

Our means of accomplishing the object of safety and considering the requirements of lift is to provide the aforementioned disc with optimum openings, each opening being provided with a lift section preceding the cutting edge. These factors are to be balanced against a minimum exposure of objects of dangerous mass to encounters with the cutting edge. In this case, consideration must be given to objects of dangerous mass that can and will get under the cutting blade. A solid disc could not impart any linear energy to such a mass. By retaining a maximum area of solid disc, we greatly reduce the possible exposure, rather tending to keep any objects of mass below the blade. By means of mass differentiation or inertia separation, the blades of grass, leaves, etc. can be made to enter the cutout in the disc behind the lift section and objects of appreciable mass cannot be pulled into a position where the cutting edge could strike more than an edge. This could impart a spinning of the object about its centroid, as previously outlined for edge contact. It is believed that inertia separation is more appropriate in description than mass differentiation, as the low values of inertia of blades of grass, leaves, etc. permits them to be carried along streamlines (path of a particle of air in motion relative to an adjacent object) while at the same time objects of greater mass remain inert or follow paths of more linear nature.

For purposes of rough cutting, such as high coarse weeds, saplings, and such, it is desirable to incorporate cutting teeth at specific points on the blade periphery. These should preferably be located at or near the point of largest diameter which would be near the previously described cutting edge. No more such teeth should be necessarily required than there are normal cutting edges. These teeth should extend downward at some angle less than perpendicular to the disc and should be sharpened on a sloping forward edge, and also if desirable, on the outer edge. These teeth should extend only a fraction of an inch and thus should be considered as safety characteristics by the same reasons for minimum exposure to objects of mass as previously described for the outer edge, as well as the normal cutting edge.

For purposes of mulching or to provide comminution of cut particles, an upwardly bent (downward slope in direction of rotation) portion should be provided to follow the cutting edge. This feature should cause cut particles to be deflected to the ground and subsequently picked up, following airstreams, to be again cut until such time as they have been allowed to escape from the housing. In order to assure that the cut particles get below the blade to be again lifted and recut, an undulating annulus (or sections of an annulus) may bridge the area between the lift section ahead of the cutting element to the succeeding upturned section at the trailing edge of the recirculation gap. This arrangement forms a rotating venturi with the ground forming the one wall and the undulating and rotating mower blade forming the other wall.

In use, our safety rotary mower blades provide a distinct number of advantages and accomplish the purposes for which they were designed in the following manner. As the disc 10 is rotated, the deflector elements 18 and 19 will create an updraft or suction immediately ahead of the knives 14 and 15. This updraft or suction will cause the materials of light weight such as grass and leaves to be lifted to an erect attitude so as to extend in the path of the rapidly rotating knives or cutting edges 14 and 15. Thus, a blade of grass which previously was leaning to one side will be caused to stand erect so as to be cut off at the lowest possible elevation and a piece of loose light material such as a leaf will be drawn bodily upwardly into the path of the blade and be severed thereby. On the other hand, objects having a relatively high density such as sticks, stones and the like have sufficient inertia to preclude their being lifted upwardly into the path of the oncoming knives 14 and 15. Thus, a mass differentiation feature is provided which precludes the impartation of a dangerous trajectory to objects of relatively high density.

At the same time while the disc 10 is rotating rapidly, the outermost tips of the knives 14 and 15 extend outwardly only a very small distance beyond the peripheral portion of the disc immediately thereahead. As a result, if any relatively heavy object extends upwardly to the level of the disc 10, it will not be engaged sufficiently close to the center of the object to cause the object to receive a dangerous trajectory therefrom. On the contrary, the object may be caused to turn or spin slightly, but it can never be sufficiently firmly engaged to lift the object and project it so as to endanger observers or the user of the machine. Thus, it can be readily seen that it is impossible for any object of any size to be sufficiently firmly engaged by the cutting edges 14 and 15 to project them outwardly at a dangerous speed and, therefore, a very important safety feature has been added to this type of blade.

In the use of the embodiment shown in Figures 3–5, the deflector elements 27 and 28 serve the same purposes as the deflector elements 18 and 19 described in Figure 1. These deflector elements create an updraft so as to cause the grass to stand erect and be severed by the blades 25 and 26 at the lowest possible elevation. The trailing deflector elements 29 and 30, however, serve an added function in that they deflect the air and cut grass downwardly again to an elevation below that of the disc 20 so that when the deflector element 27 comes along, the already cut grass will again be drawn upwardly into the path of the knife 25. In this manner, the cut grass will be re-cut and will pass downwardly beneath the deflector 29 and the disc 20. This will continue to take place until the grass is so finely comminuted that it passes outwardly between the disc and the housing therefor.

Another feature and advantage provided by the embodiment shown in Figures 3–5 is the use of the auxiliary cutting elements 31 and 32. These elements serve to sever relatively high grass which may be bent over and thus presented at a poor angle for cutting by the blades 25 and 26. These auxiliary cutter elements 31 and 32 will engage tall grass which is bent over by the housing and will quickly sever it at a level so that the remaining stubble will be quite similar to other uncut grass and will be again severed by the blades 25 and 26 but at a lower elevation.

The embodiment shown in Figures 6 and 7 is quite similar to the embodiment shown in Figures 3–5 and most of the advantages of the latter are contained in this third embodiment. An added advantage is provided, however, in that the cut-away portions are formed inwardly of the periphery of the disc so that the rotary blade as a unit will remain substantially stronger than if the cut-away portions are formed in the periphery of the disc, as shown in Figure 3. In the embodiment shown in Figure 6, the periphery is substantially unbroken with the exception of the downwardly struck portions which form the auxiliary cutter elements 36 and 37. The same recirculation feature is provided as is shown in Figure 7 and the grass will accordingly be comminuted by repeated withdrawal upwardly into the paths of the knives 46 and 47.

Thus, it can be seen that we have provided a novel and improved rotary lawn mower blade having a number of distinct advantages over the types of rotary blades previously known. The entire blade can be manufactured very simply and inexpensively and requires a minimum of material. In addition, the blade has substantially greater strength than the type of blade commonly known and utilized.

It will be noted that our blade has a safety feature which has not been previously known in rotary mower blades. Our blade effectively prevents the impartation of a dangerous trajectory to an object engaged thereby because the blade is so constructed that only a small portion of the cutting edge can engage a foreign object and, therefore, it is impossible for the blade to engage that object at its centroid.

It will also be noted that our blades have a mass differentiation feature which effectively eliminates the drawing of relatively dense objects into the path of the rapidly rotating knives. Only grass and other light readily severable material will be lifted into the path of our knives and other relatively heavy foreign and undesirable objects will be passed over by the discs and not lifted into the path of the knife. Because the grass is drawn to an upright and erect attitude it will be severed at the lowest possible elevation.

It should also be noted that our rotary mower blades, because of their construction from a disc, are substantially more sturdy than the rotary mower blades previously known. Because they are essentially a disc in structure, they revolve with a substantial reduction in the amount of noise normally attendant with the revolution of rotary mower blades. Also, because they are substantially a disc in structure, the amount of vibration is reduced and, therefore, the engine which is used to drive the blade will last longer and give better service. In addition, because the blades are substantially a disc in structure, we have eliminated the costly consumption of power normally attendant with the revolution of rotary mower blades by "beating-up" the air within the housing. Most rotary blades set up currents and counter-currents of air of relatively high velocities and, as a result, a substantial amount of power is consumed as a result of the action of these currents and counter-currents.

Another advantage of our rotary mower blades is that they provide a recirculation feature within themselves which effects efficient comminution of the cut grass. The grass is repeatedly submitted to the cutting blades until it is comminuted sufficiently finely to pass outwardly between the periphery of the discs and the housing.

It will, of course, be understood that various changes may be made in the form, details, arrangement and proportion of the parts without departing from the scope of our invention.

What we claim is:

1. A rotary mower blade comprising a horizontally disposed, flat, generally circular disc adapted for rotation about its center, and having a cuting portion confined to an area adjacent the periphery thereof and extending radially only a relatively short distance as compared to the diameter of the disc, said disc having an opening at its cutting portion bounded on one side by a generally radially extending cutting edge coplanar with said disc and on its opposite side by an upwardly inclined disc portion merging with said disc along a generally radial line thereof, said upwardly inclined disc portion forming a substantially radially disposed deflector immediately ahead of said cuting edge, with respect to the direction of rotation of the disc to create an updraft immediately ahead of said cutting edge during rotation of the disc whereby only relatively light material such as grass will be lifted into the path of said cutting edge.

2. A rotary mower blade as defined in claim 1 wherein said disc is provided with a depending auxiliary cutting element peripherally disposed on said disc and in circumferentially spaced relationship to said cutting portion.

3. The rotary mower blade as defined in claim 1 wherein the periphery of said disc defines an Archimedes spiral increasing outwardly and terminating at said radially extending cutting edge.

4. A rotary mower blade as defined in claim 1 wherein said disc is provided with a second cutting portion disposed in diametrically opposed relationship to the first mentioned cutting portion, said disc having a second rectangular opening at its second cutting portion bounded on one side by generally radially extending cutting edge coplanar with said disc and on its opposite side by an upwardly inclined disc portion merging with said disc along a generally radial line thereof, said second upwardly inclined disc portion forming a substantially radially disposed deflector immediately ahead of, with respect to the rotation of the disc, said disc to create an updraft immediately ahead of said second cutting edge during rotation of the disc.

5. A rotary mower blade as defined in claim 4 wherein the periphery of said disc defines, on opposite sides thereof, an Archimedes spiral increasing outwardly and terminating at said radial cutting edges.

6. A rotary mower blades as defined in claim 1 wherein said disc is provided with a second generally rectangular opening disposed rearwardly of, with respect to the direction of rotation of the disc, the first mentioned opening bounded on one side by an upwardly inclined disc portion forming a substantially radially disposed auxiliary deflector having its free edge disposed toward said radial cutting edge and merging with said disc remote from said cutting edge and along a generally radial line of the disc so that the second deflector element deflects air and cut grass downwardly to the area below the disc.

7. A rotary mower blade of generally uniplanar disc-like form, said blade having at least one peripheral opening, said opening having spaced edge portions, one of said edge portions constituting a cutting edge and the other of said edge portions extending out of the plane of said blade to form a fan, said blade having a periphery generally increasing in diameter from a point adjacent a fan to a point adjacent a cutting edge.

8. The structure defined in claim 7 wherein said blade has a plurality of said openings disposed at opposite sides of said blade.

9. The structure defined in claim 7 wherein said edge portion of said blade which extends out of the plane of said blade extends upwardly whereby grass and the like will be caused to stand erect in the path of said cutting edge portion.

10. The structure defined in claim 7 wherein said cutting edge portion extends outwardly beyond said other edge portion a short distance relative to the radius of said blade.

11. The structure defined in claim 7 wherein said other edge portion extends generally radially and said cutting edge portion extends outwardly beyond said other edge portion a short distance relative to the radial length of said other edge portion.

12. The structure defined in claim 7 wherein said other edge portion extends radially less than one-fourth the radius of said blade.

References Cited in the file of this patent

UNITED STATES PATENTS

| | | |
|---|---|---|
| Re. 18,944 | Beazley | Sept. 12, 1933 |
| 750,329 | Windingstad | Jan. 26, 1904 |
| 1,336,257 | Muzzy | Apr. 6, 1920 |
| 1,656,105 | Durkee | Jan. 10, 1928 |
| 1,954,579 | Smith | Apr. 10, 1934 |